United States Patent [19]

Handtmann et al.

[11] Patent Number: 4,688,424
[45] Date of Patent: Aug. 25, 1987

[54] APPARATUS FOR MEASURING AIR QUANTITY

[75] Inventors: Dieter Handtmann, Sindelfingen; Ulrich Kuhn, Renningen-Malmsheim, both of Fed. Rep. of Germany

[73] Assignee: Robert Bosch GmbH, Stuttgart, Fed. Rep. of Germany

[21] Appl. No.: 804,153

[22] Filed: Dec. 3, 1985

[30] Foreign Application Priority Data

Dec. 5, 1984 [DE] Fed. Rep. of Germany ....... 3444347

[51] Int. Cl.$^4$ ................................................. G01F 1/68
[52] U.S. Cl. ...................................................... 73/204
[58] Field of Search .................................. 73/118, 204

[56] References Cited

U.S. PATENT DOCUMENTS

| | | | |
|---|---|---|---|
| 4,214,478 | 7/1980 | Layterbach | 73/204 |
| 4,279,146 | 7/1981 | Wessel et al. | 73/118 |
| 4,283,944 | 8/1981 | Gruner et al. | 73/204 |

Primary Examiner—Herbert Goldstein
Attorney, Agent, or Firm—Walter Ottesen

[57] ABSTRACT

An apparatus for measuring the rate of flow of a fluid such as for measuring the quantities of intake air of internal combustion engines. The apparatus includes a first conductive film and a second conductive film applied to a substrate and which are in thermal contact with one another and are introduced into the flowing medium. The apparatus includes a resistance-measuring arrangement connected to a control function to form a closed loop. The resistance value of the first film is sensed by the resistance-measuring arrangement and, by applying energy, the control function regulates the first film to a temperature dependent on at least the quantity of air flowing past. This apparatus further provides that the output quantity of the control function is applied to the second conductive film, that both conductive films have at least approximately the same sheet resistance, and that their geometry is adapted to each other so that the second film is controlled to at least approximately the temperature of the first film.

19 Claims, 5 Drawing Figures

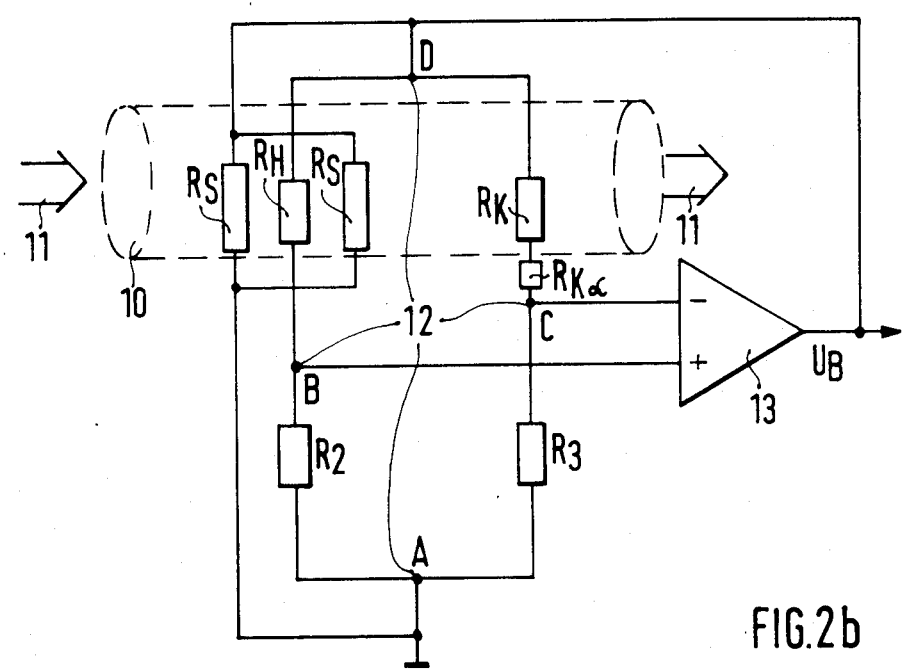
FIG. 1
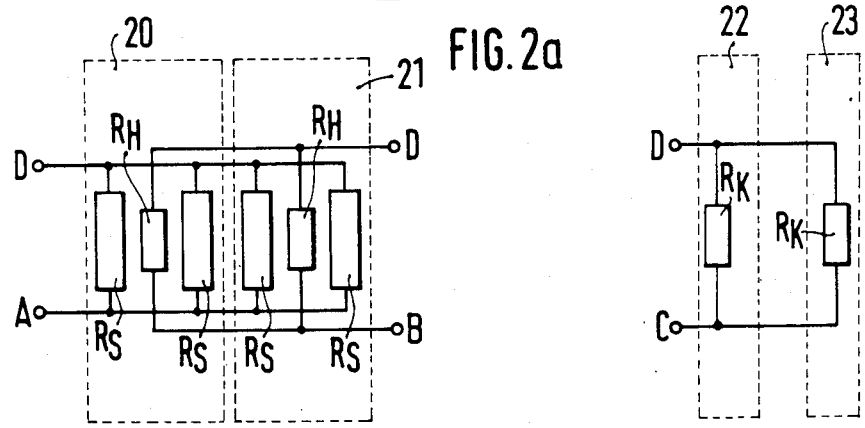
FIG. 2a
FIG. 2b

APPARATUS FOR MEASURING AIR QUANTITY

FIELD OF THE INVENTION

The invention relates to an apparatus for measuring the rate of flow of a fluid such as for measuring the quantity of air drawn by an internal combustion engine. The apparatus includes at least a first conductive film and a second conductive film disposed on a substrate. The conductive films are in thermal contact with each other and are disposed in the flowing fluid. The apparatus includes a resistance detection arrangement and a control circuit which are connected together to define a closed loop.

BACKGROUND OF THE INVENTION

U.S. Pat. No. 4,214,478 discloses an air-quantity measuring apparatus of the type referred to above wherein at least two films are deposited upon a carrier with at least one film serving as heating resistor for the carrier. The second film serves as measuring resistor of an anemometer configured for constant-temperature operation. For the heating resistor, a separate device for controlling its temperature is provided such that the carrier is adapted to be heated to the temperature of the second film by the heating resistor. The advantages of this known device are that the actual measuring resistor is assigned a heating resistor to provide protective heating which ensures a quick and accurate response of the device to changes in the quantity of the flowing air.

On the other hand, this known device is characterized by a highly complex circuit configuration using two different control systems. In addition, adapting the control time constants of the two control systems is problematical, so that in practice different time constants occur in the heating of the two resistors, causing heat flows which can not be ignored. Tests have shown that the geometry of the heating resistor relative to the measuring resistor on the substrate is not optimal.

SUMMARY OF THE INVENTION

It is an object of the invention to provide an apparatus for measuring the air flow which, on the one hand, is of simple electronic configuration and, on the other hand, meets the demands placed on measuring accuracy and response time. It is a further object of the invention to improve upon the known apparatus so as to permit a simplified and cost-effective quantity production thereof.

In addition to reducing the complexity of the circuit, the apparatus of the invention affords the advantage that the resistance sensing arrangement is to a large extent freely dimensionable. For a short transient time associated with changes in the flow rate, the apparatus of the invention provides a substantially improved response characteristic. Moreover, it has proved particularly advantageous to use the output quantity of the control function as the measurement quantity for the flow with a special type of compensation of the effect of the fluid temperature on the measured value providing particularly good results. Because the resistor film necessary for compensation can be manufactured using the same technology as for the first and second conductive films, substantial advantages are afforded with respect to the tolerances permissible in large-scale production.

Further advantages of the invention will become apparent from the following description and the drawing in conjunction with the claims.

BRIEF DESCRIPTION OF THE DRAWING

The invention will now be described with reference to the drawing wherein:

FIG. 1 is a circuit diagram of the apparatus of the invention;

FIGS. 2A and 2B are schematics of a second embodiment of the arrangement of the conductive films with respect to each other;

DESCRIPTION OF THE PREFERRED EMBODIMENTS OF THE INVENTION

Figure 4:
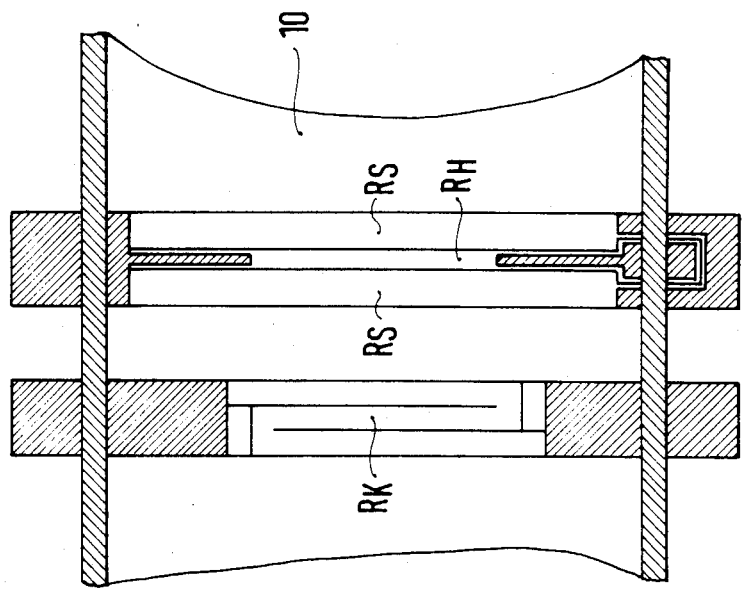

Referring now to FIG. 1, reference numeral 10 identifies a pipe through which fluid flows in the direction shown by arrows 11. To explain the mode of operation of the apparatus of the invention, it is generally irrelevant how the direction of fluid flow is defined. A resistor $R_H$ is mounted in the flowing fluid. This resistor $R_H$ has preferably a positive temperature coefficient and detects the quantity flowing through the pipe 10. Resistor $R_H$ is a film resistor which is deposited on a substrate not shown in FIG. 1 and forms part of a resistance-measuring arrangement 12 configured as a bridge circuit in the present embodiment. The resistance-measuring arrangement 12 is complemented by resistors $R_K$, $R_2$ and $R_3$. Starting from base A of this resistance bridge, one branch includes series resistors $R_2$, $R_H$, while the other branch includes series resistors $R_3$, $R_K$. The connecting leads of resistors $R_H$ and $R_K$ are connected together at point D. A control amplifier 13 receives the signals from point B, which is the circuit node between resistors $R_2$ and $R_H$, and from point C which is the circuit node between resistors $R_3$ and $R_K$.

In the preferred embodiment of FIG. 1, control amplifier 13 is configured as a differential amplifier. It is understood, however, that the invention is not limited to such differential amplifiers but is generally applicable to any analog and digital control function.

Since the output quantity of the control function is fed back to point D of the resistance-measuring arrangement, a closed loop is obtained. Generally, the resistance values of the resistor of arrangement 12 are chosen such that resistors $R_K$, $R_3$ assume substantially higher values than resistors $R_H$, $R_2$. The invention is, however, not dependent on this special choice of resistances and is also suitable for use in other combinations.

It is understood that the resistance-measuring arrangement 12 is not necessarily limited to a bridge circuit as in the embodiment but permits also other resistance-measuring circuits for its implementation. Consequently, the invention is not restricted to bridge circuits but also relates particularly to measuring circuits similar to bridges as disclosed, for example, in U.S. Pat. No. 4,297,881.

The operation of the arrangement of the invention is described below.

The output current of control amplifier 13 heats resistor $R_H$, with the temperature of this resistor being essentially given by the ratios of the bridge resistors. Via the closed loop, the amount of heat dissipated by resistor $R_H$ is continuously compensated for by a corresponding change in the current supply, so that resistor $R_H$ is maintained at a specific temperature or at a specific resistance value. The heating current, the heating capacity or also the output voltage of control amplifier 13 are a measure of the rate of flow of the flowing medium.

Since variations in the fluid temperature during a measurement also affect the temperature of the resistance value of resistor $R_H$, resistor $R_K$ is likewise exposed to the fluid flow to compensate for the effect of the temperature fluctuations of the fluid on the measurement of the mass flow rate of the medium. This resistor $R_K$ is also preferably a film resistor evaporated upon a substrate, for example. In order for resistor $R_K$ to fulfill its purpose as temperature-compensation resistor, it is necessary for the temperature coefficients $\alpha_K$ of $R_K$ and $\alpha_H$ of $R_H$ to be in a predetermined relationship to one another, depending on the evaluation method for sensing the signal quantity.

Because resistor $R_H$ is preferably a film resistor, the following improvements over a wire resistor result:

(a) manufacture is cost-effective because it dispenses with the need for an annealing equipment (contamination problem), and because at least resistors $R_H$ and $R_K$ are integrated on the substrate applying one technology;

(b) the mechanical strength is improved, thereby permitting an increased operating temperature and a better solution of the contamination problem;

(c) as in the hot wire, very short response times of the order of one millisecond are possible (flow pulsations pose no problem); and, (d) the response times in the event of changes in the air temperature are also short.

However, to avoid major changes in the temperature profile over the spatial range of resistor $R_H$, special measures are necessary to optimize the transient time in the presence of flow changes.

As theoretical examinations and experiments have shown, a protective heating of resistor $R_H$ is particularly suitable for this purpose. With this protective heating, the immediate vicinity of resistor $R_H$, or more specifically, considering the sheetlike form of $R_H$, the edges are maintained at the particular over temperature determined by the instantaneous rate of flow and the temperature of the fluid to be measured. Known apparatus use a second separate control circuit for this protective heating. This increases the complexity of the circuit substantially and makes the adjustment of the thermal and electrical time constants of the two systems very problematical.

In the present embodiment of the apparatus of the invention, two protective heating resistors $R_S$ are applied to the same substrate as resistor $R_H$ on either side thereof. The resistors $R_S$ for the protective heating can be preferably manufactured applying the same technology as resistors $R_H$ and $R_K$ and have the same square resistance. They receive the output quantity of control amplifier 13, their function being passive, which means that they are controlled to a specific temperature value dependent on the temperature of resistor $R_H$ However, in order for the temperatures of resistor $R_S$ to coincide with the temperature of resistor $R_H$, a suitable geometry has to be provided for these resistors because of their identical sheet resistance.

It can be shown that the temperature of heated film resistors is determined by the voltage drop per unit of length of the film resistor. Accordingly, the film resistors have to be configured such that the length ratio $1_H/1_S$ of resistors $R_S$ and $R_H$ equals the value given by the resistance ratio $R_H/(R_H+R_2)$ with the bridge balanced. When dimensioning the film resistors in this manner, it can be assumed that the protective-heating resistors $R_S$ are at least approximately at the same temperature level as resistor $R_H$.

Another advantage of this arrangement results from the fact that a major portion of the necessary heating power is withdrawn from the bridge branch including resistors $R_H$, $R_2$ and supplied to the protective-heating resistors $R_S$. The power loss occurring at resistor $R_2$ can thus be reduced. Another measure, namely the use of output voltage of control amplifier 13 as the measured quantity, proves also favorable for the power balance of the overall arrangement in the presence of changes in the air temperature. Moreover, the measured quantity $U_B$ has a large signal swing which is advantageous for the accuracy of the further processing of the measured data.

As indicated above, the compensation of the effect of the fluid temperature requires, depending on the choice of the evaluation quantity, the adjustment of a specific temperature coefficient of resistor $R_K$ relative to the temperature coefficient of resistor $R_H$. Under simplifying assumptions, the following value can be specified for the temperature coefficient $\alpha_K$ in dependence on the temperature coefficient $\alpha_H$ of resistor $R_H$:

$$\alpha_K = \frac{\alpha_H}{1 + 2 \cdot \beta \cdot \alpha_H \cdot \Delta T_o}$$

where the bridge ratio is $\beta = R_H/(R_2+R_H)$, and wherein $\Delta T_o$ is the excess temperature of resistor $R_H$.

Considering in addition a temperature dependence of the heat-transfer coefficient, initially assumed to be constant, of the known King equation for the hot film, "actual" values, which are approximately 10% to 20% lower, result for $\alpha_K$.

The temperature coefficient $\alpha_K$ is adjusted by inserting a resistor $R_{K\alpha}$ between points C and D of the resistance-measuring circuit. The temperature coefficient $\alpha_{K\alpha}$ of resistor $R_{K\alpha}$ assumes approximately the value $\alpha_{K\alpha} \approx 0$, with $\alpha_H = \alpha_K \neq 0$, so that appropriately combining $R_K$ and $R_{K\alpha}$ the relationship between $\alpha_K$ and $\alpha_H$ according to the above-mentioned requirements can be realized. In this arrangement, $R_{K\alpha}$ is preferably not exposed to the flowing medium.

As a result of this special compensation, the apparatus affords another advantage, that is, the swing of the temperature of the film resistor $R_H$ is small as a function of the fluid temperature. This fact proves particularly advantageous in the configuration of the soldered connections of the outgoing leads of the film resistors. In particular, at very high fluid temperatures, this makes it possible to reduce the thermal load of these connections or to soft-solder the connections in various applications. In addition, the risk of contamination at low fluid temperatures is reduced.

FIG. 2 shows a preferred embodiment of film resistors $R_H$, $R_S$ and $R_K$. Each of these resistors is subdivided into two resistors. This permits particularly resistors $R_H$ and $R_S$ to be provided on both sides of the substrate, thereby ensuring a substantially more uniform distribution of the temperatures of resistor $R_H$.

In FIG. 2a, the lower and upper sides of the substrate are identified by reference numerals 20 and 21, respectively. Resistors $R_H$ are parallelly connected and disposed in the respective centers of the lower side 20 and the upper side 21 of the substrate. Resistors $R_S$, which protectively heat resistors $R_H$, enclose resistor $R_H$ on the lower side 20 and on the upper side 21 of the substrate in respective pairs. In the embodiment shown, the protective-heating resistors $R_S$ are also connected in parallel. The identification of the circuit nodes corresponds to that of the embodiment of FIG. 1.

It has proved an advantage to provide also the resistor $R_K$, which is used to compensate for the variations in the fluid temperature, on the lower and upper sides 22 and 23, respectively, of a further substrate. In the embodiment of FIG. 2b, two resistors $R_K$ are connected in parallel, although a series connection would be equally appropriate for specific individual applications.

There are two reasons favoring this configuration. The first reason is the fact that the film resistors can be manufactured to substantially less closer tolerances. Practice has shown that the thickness of the film resistors and thus their specific electric properties may assume different relative values as a result of different evaporation rates on the substrate lower and upper sides. By breaking up the resistors $R_H$ and $R_K$ and placing them on the lower and upper sides of the substrate, all film resistors can be manufactured in a single process under identical conditions, so that differences in the properties with respect to lower and upper sides of the substrate affect all resistors equally and are thus eliminated. The second reason for this configuration comes to bear when resistor $R_K$ also is heated to a certain degree because of its dimensions. In this embodiment, too, the arrangement of resistor $R_K$ on both sides of the substrate ensures a more uniform distribution of temperature over the film resistor. Heating the resistor $R_K$ may have certain advantages if it is desired to trim the arrangement to particularly short response times with respect to changes in the fluid temperature.

Figure 3:
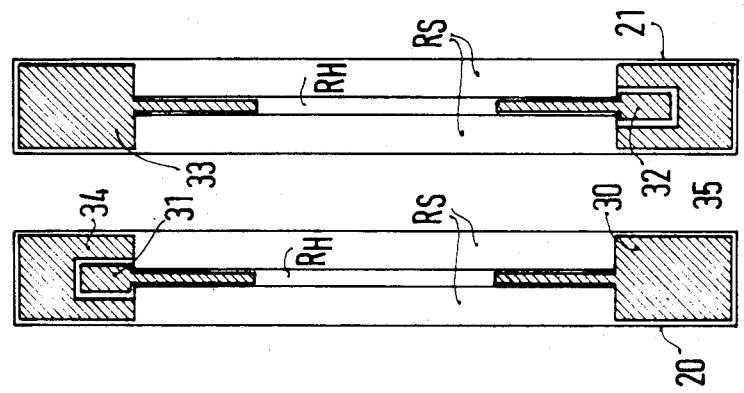
FIG. 3 is an embodiment illustrating the geometry of the conductive films on the substrate; and, FIG. 4 is an embodiment illustrating the arrangement of the substrates of three conductive films in the fluid.

FIG. 3 is a detail view of the embodiment of FIG. 2a. As in FIG. 2a, the lower and the upper sides of the substrate are identified by reference numerals 20 and 21, respectively. The substrate is approximately 4 mm wide and 25 mm long. The deposition on the upper and lower sides of the substrate is symmetrical with resistor $R_H$ being arranged in the center and having a length of about 10 mm and a width of approximately 0.5 to 2 mm. Resistors $R_S$ are evaporated upon the substrate on both sides of resistor $R_H$ and have a width of about 20 mm. It is to be noted, however, that the length ratio of film resistors $R_H$ and $R_S$ depends on the resistance ratio of the bridge resistors $R_H$ and $R_S$. The absolute length is determined from the required integration length of $R_H$ which, among other factors, depends on the flow conditions at the measuring point.

The present embodiment relates to a symmetrical bridge configuration. The hatched areas identify the low-resistance conducting paths and reference numerals 30, 31, 32, 33 identify the conducting paths for the terminals of resistor $R_H$. On the other hand, the conductors required for resistors $R_S$ are identified by reference numerals 34 and 35. The terminals 30 and 33 are identical for $R_S$ and $R_H$ and correspond to circuit node D in FIG. 1. The sheet resistance $R_\square$ is in the range of $0.25 \leq R_\square \leq 2.0$ ohms, while the low-resistance conductor has a sheet resistance in the range of $R_\square = 0.025$ ohm.

FIG. 4 shows the arrangement of the substrates supporting the film resistors in pipe 10 shown in longitudinal section. The two substrates include film resistor $R_K$ and film resistors $R_H$, $R_S$, respectively. The substrates are preferably aligned with respect to the direction of fluid flow such that the surface normal defines a right angle with the velocity vector of the fluid flow. This ensures that the zones susceptible to contamination (film resistor $R_H$) are not directly exposed to the action of contaminating particles. Long-term drifts as they occur in known wire resistors are thereby avoided, and the problems involved in a possibly necessary annealing of the resistors are reduced. In addition, it is also possible and in various applications very advantageous to have the surface normal form an angle of $\alpha \approx 90°$ with the vector of the flow direction. In such an embodiment, the substrate upper and lower sides are exposed to different flow intensities depending on the direction of flow which makes it possible to detect the direction of flow.

Regarding the dimensions of resistors $R_H$ and $R_2$, a ratio of $R_H/R_2 = 2$ has proved to be advantageous. By contrast with a symmetrical bridge configuration, resistor $R_H$ has twice the useful power of resistor $R_2$, so that with the power requirements being identical to those of a symmetrical bridge, either a double wire length and thus a double integration length or an increase in the over temperature by a factor of 2 results.

It is understood that the foregoing description is that of the preferred embodiments of the invention and that various changes and modifications may be made thereto without departing from the spirit and scope of the invention as defined in the appended claims.

What is claimed is:

1. Apparatus for measuring the rate of flow of a flowing fluid such as for measuring the quantity of air drawn by an internal combustion engine, the apparatus comprising:
   a substrate;
   a first conductive film disposed on said substrate and having a first resistance;
   a second conductive film likewise disposed on said substrate and having a second resistance;
   said conductive films being arranged on said substrate so as to be in thermal contact with each other;
   said substrate being mounted in said flowing fluid so as to expose said films thereto;
   resistance detection means for detecting said first resistance of said first conductive film;
   control means having an output connected to said resistance detection means for conjointly defining a closed-loop control circuit therewith for supplying energy in the form of a first current to said first conductive film to control the temperature thereof in dependence upon at least the fluid quantity flowing past;
   said second conductive film being connected directly to said output so as to be supplied with energy from said control means in the form of a second current separate from said first current; and,
   said first and second resistances being of approximately the same sheet resistance and said first and second conductive films having geometrical configurations corresponding to each other so as to cause said second conductive film to be controlled to a temperature corresponding at least approximately to the temperature of said first conductive film.

2. The apparatus of claim 1, said first and second resistance films having respective elongated configurations and being dimensioned in the elongated direction so as to cause the voltage drop per unit length for both films to have approximately the same value.

3. The apparatus of claim 1, said resistance detection means and said first film conjointly defining a bridge circuit.

4. The apparatus of claim 3, resistance detection means being a bridge circuit having two bridge balancing resistors having temperature coefficients which are at least approximately equal to zero.

5. The apparatus of claim 1, comprising: a second substrate and a third film disposed on said second substrate and forming part of said resistance detection means, said second substrate being mounted in said flowing fluid so as to expose said third film thereto.

6. The apparatus of claim 5, said third film having approximately the same sheet resistance as said first and second films.

7. The apparatus of claim 5, said third film having a temperature coefficient selected to have a predetermined relationship to the temperature coefficient of said first film.

8. The apparatus of claim 5, comprising an additional resistance connected to said third film and having a temperature coefficient of approximately zero so as to cause the temperature coefficient of the effective total resistance to be in a predetermined relation to the temperature coefficient of said first film.

9. The apparatus of claim 8, said resistance detection means being a bridge circuit having a first branch including a fixed resistor ($R_2$) connected in series with said first conductive film ($R_H$) and a second branch including a further resistor ($R_3$) connected in series with said third conductive film ($R_K$); said temperature coefficient of said total resistance being adjusted to a value given by $$\alpha_K = \frac{\alpha_H}{1 + 2\beta\alpha_H\Delta T_o}$$

wherein:

$\alpha_H$ = temperature coefficient of said first conductive film
$\beta$ = bridge ratio $R_H/(R_2+R_H)$
$\Delta T_o$ = excess temperature of said first conductive film
said value $\alpha_K$ being multiplied by a correction factor of between 0.8 to 0.9.

10. The apparatus of claim 5, said third film being in two parts disposed on the upper and lower sides of said second substrate, respectively.

11. The apparatus of claim 5, said second substrate being mounted in said flowing fluid ahead of said first-mentioned substrate when viewed with reference to the direction of flow of said fluid.

12. The apparatus of claim 1, said first film being disposed in the mid region of said substrate and said second film being in two strips disposed on respective sides of said first film.

13. The apparatus of claim 1, said first film being in two parts disposed on the upper side and the lower side of said substrate, respectively, said second film being in two portions framing respective ones of said parts of said first film.

14. The apparatus of claim 1, said control means being a differential amplifier.

15. The apparatus of claim 14, said resistance-detection means being a bridge circuit having an input and forming a diagonal output voltage, said differential amplifier having an input connected to said bridge circuit for receiving said diagonal output voltage, and said differential amplifier having an output connected to said input of said bridge circuit.

16. The apparatus of claim 15, said second film being connected between said output of said amplifier and ground.

17. The apparatus of claim 1, said substrate having a normal to its surface and being disposed in said flowing fluid so as to cause said normal to be perpendicular to the direction of flow of said fluid.

18. The apparatus of claim 1, said first film and said second film having the same sheet resistance.

19. Apparatus for measuring the rate of flow of a flowing fluid such as for measuring the quantity of air drawn by an internal combustion engine, the apparatus comprising:

a substrate;
a first conductive film disposed on said substrate and having a first resistance;
a second conductive film likewise disposed on said substrate and having a second resistance;
said conductive films being arranged on said substrate so as to be in thermal contact with each other;
said substrate being mounted in said flowing fluid so as to expose said films thereto;
resistance detection means for detecting said first resistance of said first conductive film, said detection means being a bridge circuit separate from said second conductive film and having a first branch incorporating said first conductive film therein;
single control means having an output connected to said resistance detection means for conjointly defining a closed-loop control circuit therewith for supplying energy to said first conductive film to control the temperature thereof in dependence upon at least the fluid quantity flowing past;
said second conductive film being connected to said output and across said bridge circuit so as to be supplied with enegy from said control means; and,
said first and second resistances being of approximately the same sheet resistance and said first and second conductive films having geometrical configurations corresponding to each other so as to cause said second conductive film to be controlled to a temperature corresponding at least approximately to the temperature of said first conductive film.

* * * * *